(No Model.)
J. GREIMANN.
NAILLESS HORSESHOE.
No. 506,688. Patented Oct. 17, 1893.
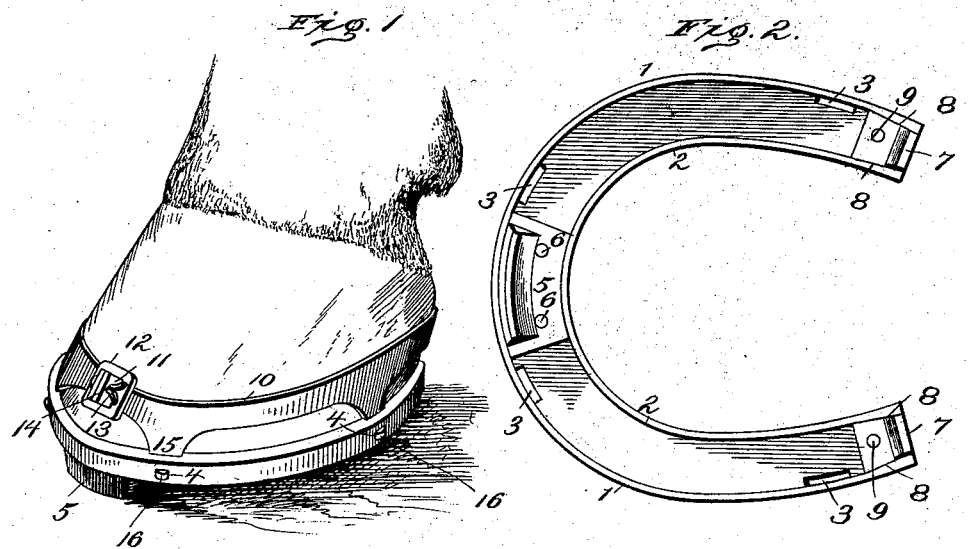
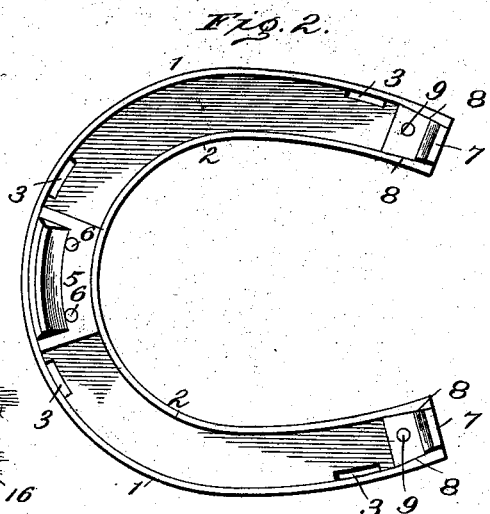
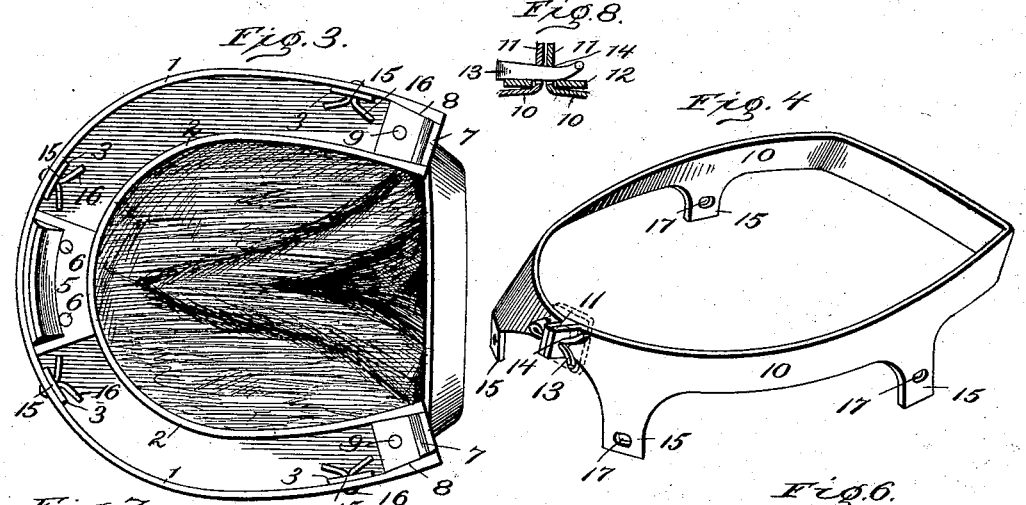
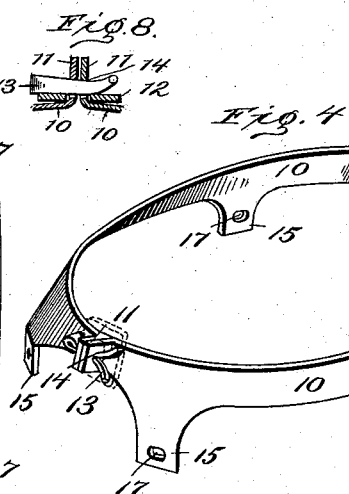
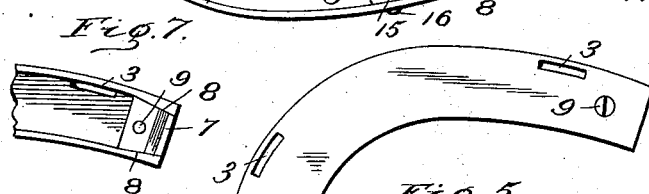
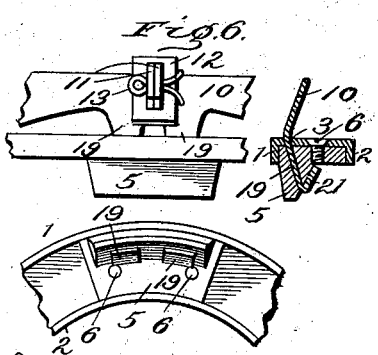
Witnesses
Edwin L. Bradford
Hugh L. Johnson
Inventor
John Greimann
By Johnson & Johnson
his Attorneys

UNITED STATES PATENT OFFICE.

JOHN GREIMANN, OF EAST ELKPORT, IOWA.

NAILLESS HORSESHOE.

SPECIFICATION forming part of Letters Patent No. 506,688, dated October 17, 1893.

Application filed June 23, 1893. Serial No. 478,639. (No model.)

*To all whom it may concern:*

Be it known that I, JOHN GREIMANN, a citizen of the United States, and a resident of East Elkport, in the county of Clayton and State of Iowa, have invented certain new and useful Improvements in Devices for Attaching Horseshoes, of which the following is a specification.

For securing shoes to the hoofs of horses without the use of nails I have provided an improved attaching device whereby the shoes can be applied and fastened, and which permits of their easy removal when desired. The shoes are specially constructed for use with separable calks, and a single hoof-band adapted for attachment to the shoe by cotter-keys and to the hoof by a cotter key. In these particulars my improvement resides and will be particularly pointed out in the claims concluding this specification, in connection with the accompanying drawings, in which—

Figure 1 shows my improved shoe attaching device as it is applied to a horse's hoof. Fig. 2 shows the under side of the shoe; and Fig. 3 is a similar view as it is applied to the horse's hoof. Fig. 4 shows the hoof-band before the shoe is attached; and Fig. 5 is the upper side of the shoe. In Fig. 6 are front, bottom and sectional views of the hoof-band as adapted for attachment to the toe-calk; and Fig. 7 is a detail showing the tapering seat for the heel-calks. Fig. 8 shows the bent ends of the hoof-band and its buckle-plate keyed thereon.

I construct the shoe with upset rims 1, 2, standing down on its under side all around its outer and inner edges; and within the outer rim and joining the inner wall of the outer rim, the shoe-plate has a series of slots 3 at suitable distances apart and in the rim at the middle of these slots are holes 4, the purpose of which I will presently state. The shoe-calks are separate and adapted to fit closely between the rims, the toe-calk 5, being fastened by screws 6, 6, to the shoe-plate from its upper side; and the heel-calks 7, 7, are fitted to seats 8, 8, between the rims by screws 9, also screwed into them from the upper side of the shoe. These seats may be tapering toward the ends of the shoe as seen in Fig. 7, the better to hold the calks firmly between the rims, and prevent the screws from being broken off. The calks thus secured between the rim, form the wear-surface of the shoe.

The band for fastening the shoe to the hoof consists of a single piece of sheet steel 10, adapted to fit entirely around the horse's hoof, upon its sloping walls with its ends bent outwardly at right angles at the front to form meeting binders 11, over which a slotted buckle-plate 12 is bound by a cotter-key 13, which passes through slots 14 in the bent band ends 11 so as to have a wedge action upon the latter to draw the band tight and firm around the hoof. See Fig. 8.

The hoof-band has its lower edge formed with tongues 15, corresponding with and adapted to fit into and through the slots 3, in the shoe-plate against the inner wall of the outer rim to which they are secured by means of cotter-keys 16, driven through the holes 4, from the outside and through co-incident slots 17, in the band-tongues 15, and thereby securely and firmly fasten the shoe to the tongues of the hoof-band. The buckled ends of the hoof-band are drawn tightly through the slot of the buckle by driving in the cotter-key and spreading its ends to lock it. As the hoof-band is quite thin this drawing action will serve to keep it tight after having been once tightly fitted upon the hoof and for which purpose the bands are made of different sizes.

The shoe must be sufficiently larger than the bottom of the hoof to expose the slots in the shoe-plate for engagement with the band-tongues, as seen in Fig. 1; and while I have described and shown the hoof-band having four tongues for engaging the slots in the shoe-plate, I may form tongues 19 also, at their meeting ends and pass them through the slots 20, in the toe-plate of the shoe, and in the toe-calk, and fasten them by clinching their ends 21, on the inner sides of the toe-calks, as shown in Fig. 6. The hoof-band should be wide enough to give a broad and full seating upon the walls of the hoof, and I may have the tongues wide enough to receive two cotter-keys.

In applying the shoe by my fastening device the band is first fitted and firmly clamped upon the hoof and the shoe is then fitted and fastened to the band-tongues.

I claim as my improvement—

1. In a nailless horse-shoe, the shoe plate constructed with rims projecting downward around its inner and outer edges and terminating in tapering calk-seats at the heel end, in combination with calks fastened by screws between said rims, the heel-calks being secured in the tapering seats, and a suitable hoof attaching device for the shoe, substantially as described.

2. In a nailless horse-shoe, the combination of the shoe having a rim standing downward around its outer edge, a series of slots joining the inner wall of the rim and holes in the rim at said slots, with a hoof-band extending around the hoof having its ends bent outwardly at the front, a slotted plate engaging said bent ends, a cotter-key binding said bent ends to said slotted plate, said band having tongues engaging the slots in the shoe, and cotter-keys fastening said tongues against the inner wall of said rim, substantially as described.

3. A fastening device for a nailless horse-shoe, consisting of a band adapted to be fitted around and upon the hoof, having its meeting ends at the front bent outwardly and provided with co-incident slots, a slotted buckle plate engaging said bent ends and a cotter-key on the buckle in the slots of the bent ends, and suitable means for fastening the band to the shoe.

4. In a nailless horseshoe, the combination, of the shoe having a rim standing down around its outer edge, a series of slots joining the inner wall of the rim and holes in the rim at said slots, with a hoof-band having its front ends fastened, and having tongues engaging said slots in the shoe, the toe-calk having slots into which the tongues at the fastened ends of the hoof-band are clinched, and means for fastening the other of said tongues in the slots of said shoe-plate.

5. In a nailless horse-shoe, a band adapted to fit entirely around the hoof and having tongues at its lower edge, in combination with a buckle-plate engaging the meeting ends of the band at the front, a wedge shaped cotter-key engaging the band ends over the buckle-plate, and means for fastening said band-tongues to the shoe, substantially as described.

In testimony whereof I have hereunto signed this specification in the presence of witnesses.

JOHN GREIMANN.

Witnesses:
D. D. MURPHY,
CHAS. JOHNSON.